May 14, 1968     T. M. BINKLEY     3,382,565
METHOD OF MANUFACTURE OF HYDRAULIC CYLINDERS
Filed April 29, 1964
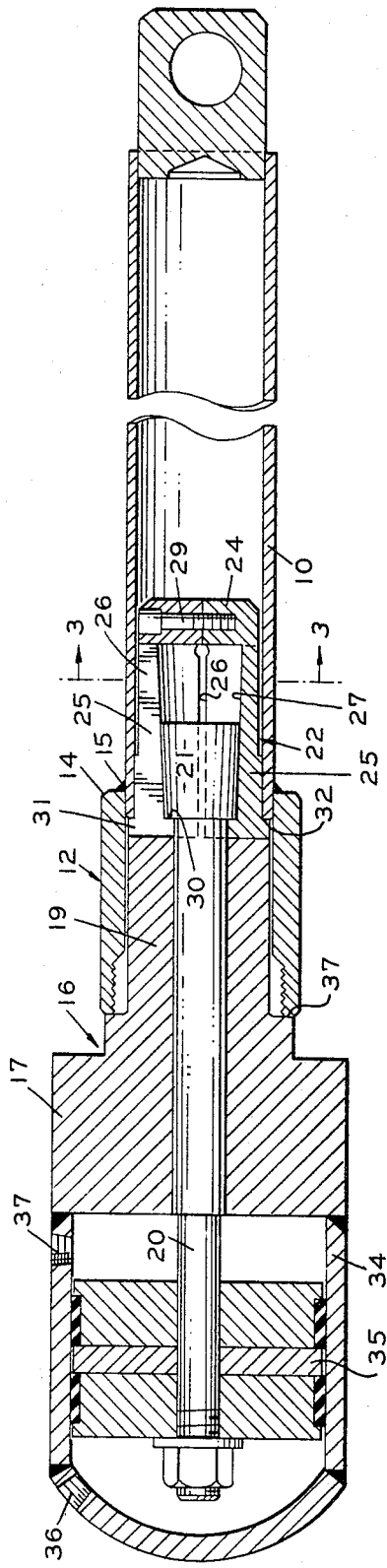
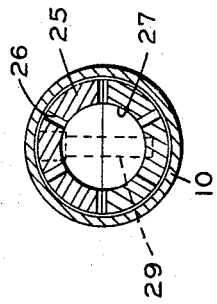
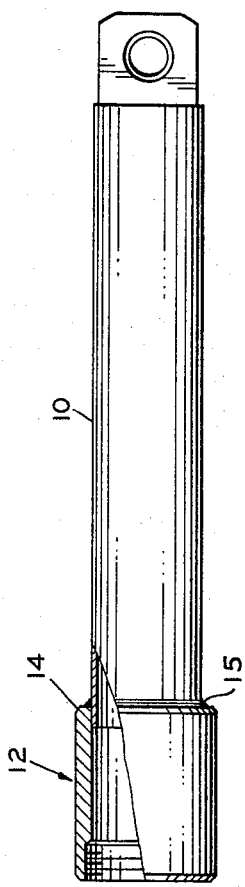
INVENTOR
THEODORE M. BINKLEY
BY
ATTORNEY

United States Patent Office 3,382,565
Patented May 14, 1968

3,382,565
METHOD OF MANUFACTURE OF HYDRAULIC CYLINDERS

Theodore M. Binkley, Troy, N.Y., assignor to Ford Motor Company, Dearborn, Mich., a corporation of Delaware
Filed Apr. 29, 1964, Ser. No. 363,434
5 Claims. (Cl. 29—474.3)

This invention relates to a process for the manufacture of hydraulic cylinders.

In the manufacture of hydraulic cylinders, it sometimes is desirable to form the cylinder of a finished tube of uniform diameter to which an end sleeve is applied to hold rod packing at the rod-end of the cylinder. In the welding of the sleeve to the cylinder, the welded metal has a tendency to shrink upon cooling, decreasing the cylinder in diameter in this area and causing slight ovality of the cylinder. In addition, oxidation of the inner surface of the cylinder is apt to occur, forming scale. In order to restore original diameter and finish of the cylinder in this area and thus to protect the piston packing, a honing operation is required.

According to the present invention, after assembly of the cylinder to the sleeve and before welding, the area to be welded is expanded by use of a cylindrical mandrel which is left in position until the weld has at least partially cooled. Then, upon release of the mandrel, the contraction in diameter of the welded area is permitted to take place. By controlling the degree of initial expansion, the degree of contraction upon removal of the mandrel can be made substantially equal to the expansion, thereby retaining after welding the original diameter of the cylinder. By using a cylindrical mandrel, concentricity and finish of the interior surface of the cylinder can be retained, thus making it unnecessary to hone or otherwise redimension or refinish the cylinder in the welded area.

Among the objects of the present invention are to provide an improved method for the welding of hydraulic cylinders; to provide such a method in which the original diameter and finish of the cylinder is not substantially changed; and generally to improve hydraulic cylinder welding methods of the type described.

Other objects and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is a side elevation of a cylinder to which the method of the present invention may be applied, a portion of the cylinder being shown in section.

FIGURE 2 is a longitudinal cross section of the cylinder of FIGURE 1, a mandrel for expanding the cylinder during welding being shown partly in elevation and partly in longitudinal cross section.

FIGURE 3 is a transverse cross section of the cylinder and mandrel, taken on the line 3—3 of FIGURE 2.

Referring now to the drawings, the cylinder to which the method of the present invention is applicable consists of a hydraulic cylinder 10 which is formed of a cylindrical steel tube of uniform diameter throughout its length. The inner surface 11 of the tube is finished to the micro-finish desired prior to fabrication into individual cylinders.

In the manufacture of hydraulic cylinders, it is often desirable to attach a concentric sleeve 12 to the end of a cylinder tube 10, the sleeve having an end 14 partially telescoped to the end of the tube. In attachment of the sleeve 12 to the tube 10 according to the present invention, a continuous fillet weld 15 is placed between the end 14 of the sleeve and the outer surface of the tube 10. This provides a permanent, leakproof attachment of the two parts. If, however, the parts are welded in the usual manner, either electrically or by gas or friction welding, the cylinder in the zone of the weld will contract somewhat upon cooling so as to be undersized. In addition, there is danger of ovality of the welded cylinder tube 10 due to the heat of welding, thus requiring additional finishing of this portion of the cylinder in order to prevent premature wear on the packing of a piston operating in the cylinder.

According to the present invention, an expandable cylindrical mandrel 16 is inserted within the cylinder tube 10 and sleeve 12 prior to welding to serve as a fixture for positioning and holding the parts during welding and also to expand the area of the tube to be welded prior to the welding operation. The degree of expansion is within the elastic limit of the tube and the sleeve and is selected so that after welding is completed and after release and removal of the mandrel, the contraction of the tube in the zone of the weld will restore it to substantially its original inner diameter.

Referring now to FIGURE 2, the mandrel 16 has a body 17 provided with a cylindrical end portion 19 adapted to fit within the sleeve 12 and an axially extending operating rod 20 mounted for endwise movement within the body portion 17 and terminating at its inner end in a frusto-conical portion 21.

A collet 22 is supported by the portion 21 of the rod 20, the collet having a solid head portion 24 and a series of integral, longitudinal extending elements 25 collectively forming a cylindrical surface fitting closely within the cylinder tube 10 and separated from each other by narrow, radially extending slots 26 extending for the length of the collet except for the head portion. The inner surface 27 of each element 25 is provided with a taper corresponding generally with the taper of the frusto-conical portion 21 of the operating rod. Preferably, the collet 22 is formed of two identical collet halves capable of being separated along a diametrical plane and secured together by a screw 29 located in the head portion 24 and extending through both halves of the collet.

The collet 22 is provided with radially inwardly and outwardly extending portions 30 and 31 at the ends of the elements 25, the inwardly extending portion 30 limiting axial movement of the operating rod portion 21 and thereby limiting the degree of expansion of the collet. The outwardly extending portions 31 fit against the end 32 of the cylinder tube 10. Preferably, the outer surface of the collet 22 is radially stepped to provide a slight clearance between the collet and the inner diameter of the tube except in the area of the tube adjacent the fillet weld 15; whereby upon expansion of the collet, only the zone of the tube 10 adjacent the weld will be expanded.

A hydraulically operated cylinder 34 is mounted on the outer end of the mandrel body 17 and provided with a double acting piston 35 mounted on the outer end of the operating rod 20. By pressurizing the cylinder either below or above the piston 35 by means of the ports 36 and 37, the rod 20 may be moved longitudinally to either expand the collet so as to expand a controlled amount the cylinder tube 10 in the zone of the weld, or release the collet and permit the collet and tube to contract.

In following the teaching of the present invention, the sleeve 12 may be telescoped onto the cylinder tube 10 and the collet portion of the mandrel 16 inserted within the tube until the portions 31 of the collet rest against the end 32 of the tube. Then, the sleeve 12 may be moved onto the portion 19 of the mandrel until the end of the sleeve contacts the step 37 thereof, at which time the sleeve and cylinder tube will be in proper position for welding.

Upon the actuation of the piston 35 to withdraw the rod 20, the collet 22 will be expanded to expand the cylinder tube 10 in the zone to be welded. The expansion is within the elastic limit of the tube and the sleeve. The precise amount of expansion is determined by trial, but is chosen so that after placing the fillet weld 15 and removing the mandrel, the inner diameter of the cylinder tube is substantially identical to its diameter before welding.

If the collet is left in position until the weld area has substantially cooled to ambient temperature, less expansion of the collet is required than if the collet is removed while the welded area is still relatively hot. It has been found that when welding cylinder tubes of about .180 in. wall thickness and 2½ in. inner diameter, it was necessary to expand the diameter of the tube about .005 in. by means of a collet in order to preserve the tube diameter unchanged. If the collet is to be removed before the weld is completely cooled, additional initial expansion by means of the collet will be required.

Use of the collet not only serves to expand the cylinder tube 10 to compensate for contraction of the tube due to the welding, but also cools the inner surface of the tube and protects it from the atmosphere to prevent heat damage and scaling of the surface and holds the cylinder tube and sleeve from warping out of round due to the heat of the weld.

I claim:

1. The method of welding a concentric metal cylindrical sleeve to an end of a metal hydraulic cylinder having a finished inner wall, comprising assembling the sleeve to the cylinder, expanding within its elastic limit by a mandrel the cylinder and sleeve in the area to be welded, uniting the cylinder and sleeve by the use of weld metal along juxtaposed portions of said cylinder and sleeve, maintaining the cylinder and sleeve expanded until the weld has a substantial amount wherein a solidification of the weld metal has occurred and then permitting the welded area of the cylinder and sleeve to contract normally, the weld metal upon cooling tending to reduce the diameter of the cylinder and the magnitude of expansion by the mandrel being selected to substantially equal the contraction in diameter of the welded area upon cooling.

2. The method of welding a concentric metal cylindrical sleeve to an end of a metal hydraulic cylinder having a finished inner wall, comprising partially telescoping the sleeve on the cylinder, expanding within its elastic limit by a mandrel the cylinder and sleeve in the area to be welded, uniting the cylinder and sleeve by the use of continuous weld metal along juxtaposed portions of said cylinder and an end of said sleeve, maintaining the cylinder and sleeve expanded until the weld has cooled a substantial amount wherein a solidification of the weld metal has occurred and then permitting the welded area of the cylinder and sleeve to contract normally, the weld metal upon cooling tending to reduce the diameter of the cylinder and the magnitude of expansion by the mandrel being selected to substantially equal the contraction in diameter of the welded area upon cooling.

3. The method of welding a concentric metal cylindrical sleeve to an end of a metal hydraulic cylinder having a finished inner wall, comprising partially telescoping the sleeve on the cylinder, expanding within its elastic limit the cylinder and sleeve in the area to be welded by use of a cylindrical mandrel, uniting the cylinder and sleeve by the use of weld metal along juxtaposed portions of said cylinder and sleeve, maintaining the cylinder and sleeve expanded until the weld has cooled a substantial amount wherein a solidification of the weld metal has occurred and then removing the mandrel to permit the welded area of the cylinder and sleeve to contract normally, the weld metal upon cooling tending to reduce the lectediameter of the cylinder the magnitude of expansion by the mandrel being selected to substantially equal the contraction in diameter of the welded area upon cooling.

4. The method of welding a concentric metal cylindrical sleeve to an end of a metal hydraulic cylinder having a finished inner wall, comprising partially telescoping the sleeve about the cylinder, expanding within its elastic limit the cylinder and sleeve in the area to be welded by use of a cylindrical mandrel, uniting the cylinder and sleeve by a fillet weld extending along the outer surface of the cylinder and an end of the sleeve, maintaining the cylinder and sleeve expanded until the weld has cooled, the fillet weld metal upon cooling tending to reduce the diameter of the cylinder and then removing the mandrel to permit the welded area of the cylinder and sleeve to contract normally, the magnitude of expansion by the mandrel being selected to substantially equal the contraction in diameter of the welded area upon cooling.

5. The method of welding a concentric metal cylindrical sleeve to an end of a metal hydraulic cylinder having a finished inner wall, comprising partially telescoping the sleeve about the cylinder, expanding within its elastic limit the cylinder and sleeve in the area to be welded by use of a cylindrical mandrel, uniting the cylinder and sleeve by a continuous fillet weld extending along the outer surface of the cylinder and an end of the sleeve, maintaining the cylinder and sleeve expanded until the weld has cooled a substantial amount wherein a solidification of the weld metal has occurred and then removing the mandrel to permit the welded area of the cylinder and sleeve to contract normally, the weld upon cooling tending to reduce the diameter of the cylinder and the magnitude of expansion by the mandrel being selected to substantially equal the contraction in diameter of the welded area upon cooling.

References Cited

UNITED STATES PATENTS

| | | | |
|---|---|---|---|
| 2,767,676 | 10/1956 | Johnson et al. | 269—48.1 |
| 2,977,916 | 4/1961 | Hawkins | 269—48.1 |
| 3,030,903 | 4/1962 | Morris | 269—48.1 |

CHARLES T. MOON, *Primary Examiner.*

L. J. WESTFALL, R. F. DROPKIN,
*Assistant Examiners.*

UNITED STATES PATENT OFFICE
CERTIFICATE OF CORRECTION

Patent No. 3,382,565                  May 14, 1968

Theodore M. Binkley

It is certified that error appears in the above identified patent and that said Letters Patent are hereby corrected as shown below:

Column 3, line 44, after "has" insert -- cooled --; Column 4, line 18, "lectediameter" should read -- diameter --.

Signed and sealed this 23rd day of September 1969.

(SEAL)
Attest:

Edward M. Fletcher, Jr.               WILLIAM E. SCHUYLER, JR.
Attesting Officer                     Commissioner of Patents